United States Patent [19]

Asplin, Sr.

[11] Patent Number: 4,475,715
[45] Date of Patent: Oct. 9, 1984

[54] AERIAL CABLE INSTALLATION BLOCK

[75] Inventor: William A. Asplin, Sr., Canton, Ohio

[73] Assignee: Rescue Cable Design, Inc., Canton, Ohio

[21] Appl. No.: 424,104

[22] Filed: Sep. 27, 1982

[51] Int. Cl.³ .............................................. B66D 3/04
[52] U.S. Cl. ............................................ 254/134.3 R
[58] Field of Search ............... 254/134.3 R, 134.3 PA, 254/388, 389, 393, 394, 397, 409

[56] References Cited

U.S. PATENT DOCUMENTS

| | | | |
|---|---|---|---|
| Re. 25,549 | 4/1964 | Hendrix. | |
| 856,335 | 6/1907 | Callahan. | |
| 973,633 | 10/1910 | Davis | 254/134.3 R |
| 1,683,578 | 9/1928 | Mobius et al. | 254/134.3 R |
| 2,980,401 | 9/1959 | Witmor. | |
| 3,098,638 | 7/1963 | McAuley | 254/134.3 PA |
| 3,134,575 | 5/1964 | Walter. | |
| 3,146,994 | 9/1964 | Sherman | 254/134.3 R |
| 3,853,304 | 12/1974 | Jackson. | |
| 4,160,540 | 7/1979 | Lindsey et al. | |
| 4,423,853 | 1/1984 | Davis | 254/134.3 R |

Primary Examiner—Robert C. Watson
Attorney, Agent, or Firm—Oldham, Oldham, Hudak, Weber & Sand Co.

[57] ABSTRACT

An aerial block which is releasably mounted on a support cable either at a pole or in a span between two poles for installing coaxial aerial cable which then is secured to the support cable. The block has a frame formed by two spaced generally L-shaped members connected by a lower stabilizing bar. The vertical upstanding portion of each L-shaped member has a hooked end which suspends the block from the support cable at a pole location. The stabilizing bar abuts the pole to maintain the frame in a position wherein the leg members extend horizontally outwardly from the pole to provide two spaced points of support for a coaxial cable being installed to prevent kinking or bending of the cable. A spring-biased plunger mechanism is provided on each of the vertical leg members for releasably attaching the frame on the support cable between poles. A plurality of plastic sleeves or wheels are rotatably mounted on the horizontal leg member and separated by vertical divider posts, to facilitate the sliding movement of the cable. The spring-biased plungers apply sufficient pressure on the cable to maintain the frame in proper position wherein the cable supporting legs are horizontal yet enables a lashing machine to slide the block along the support cable during a lashing operation.

14 Claims, 14 Drawing Figures

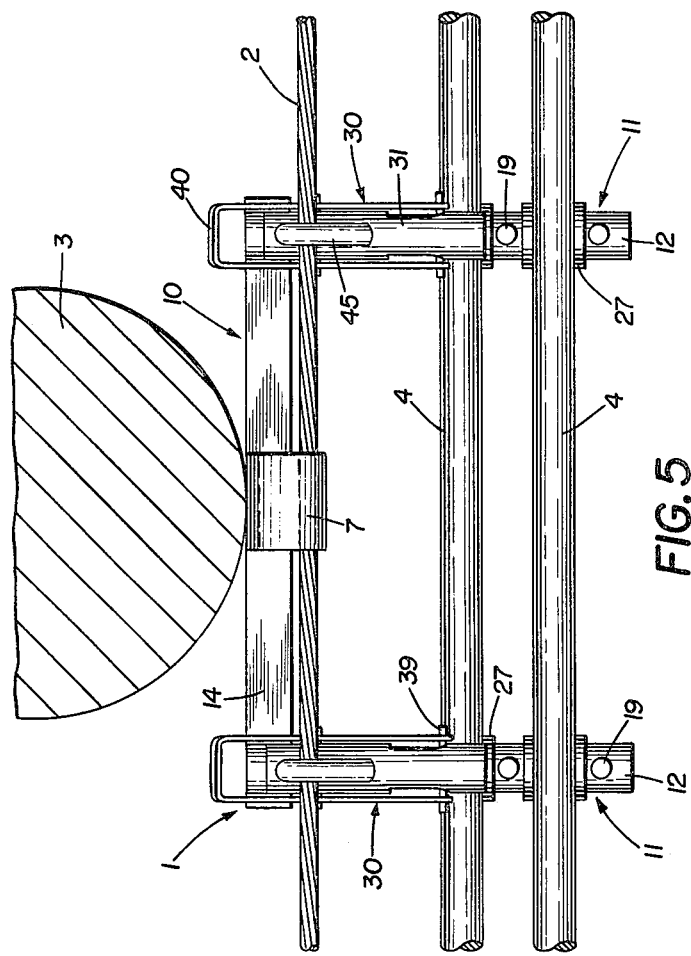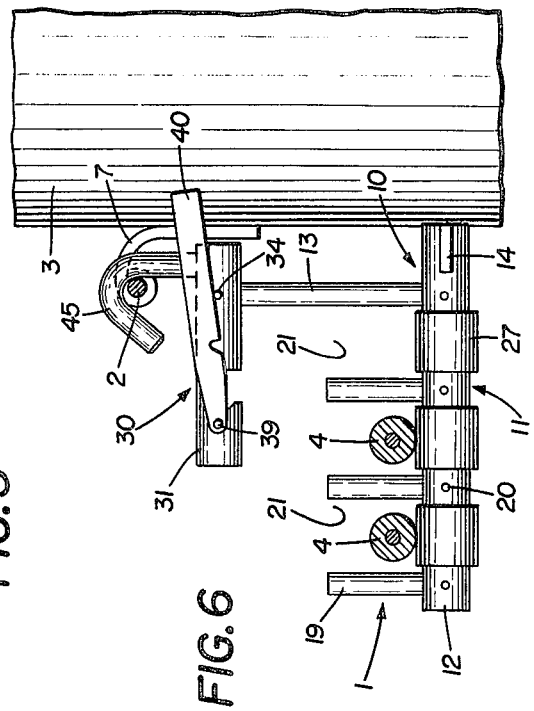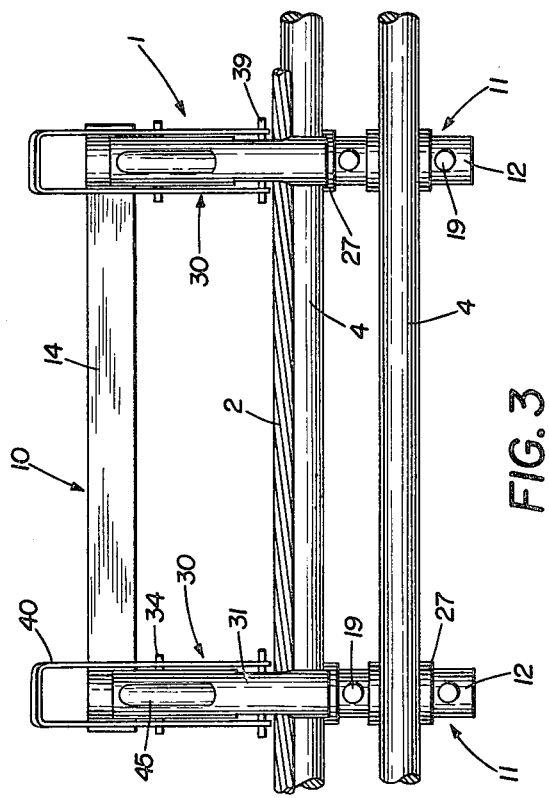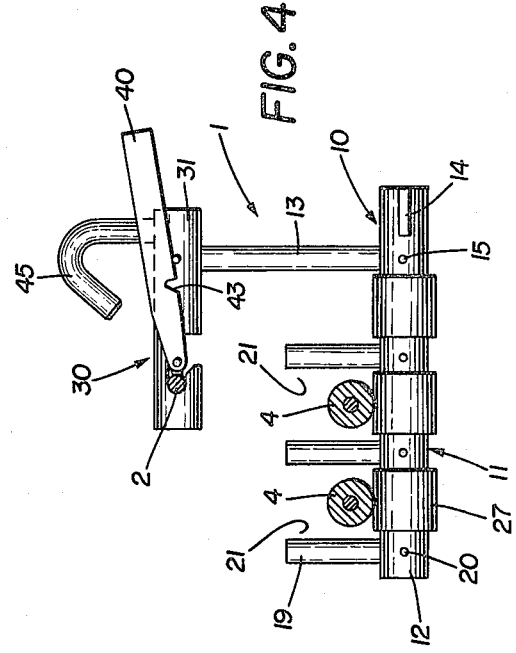

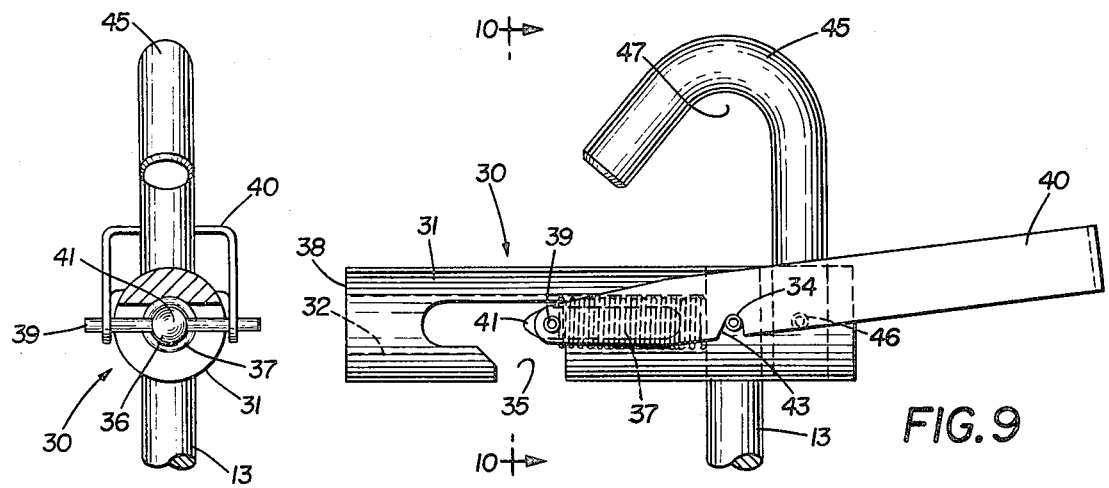
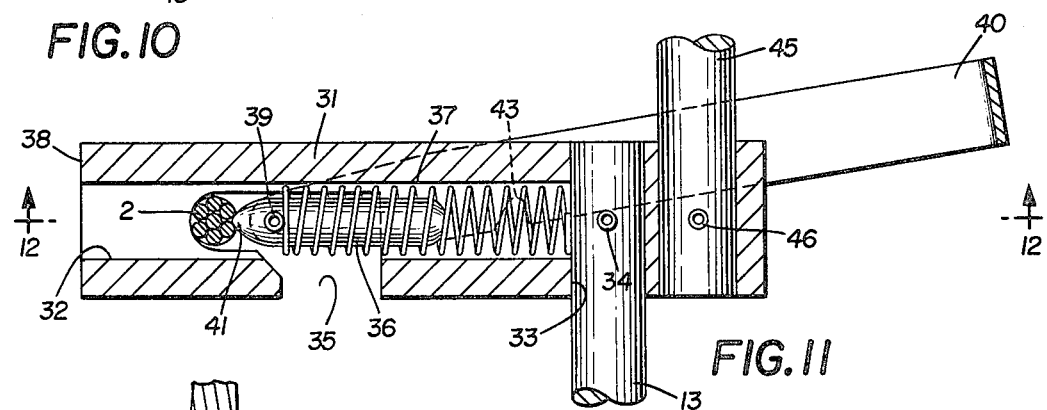
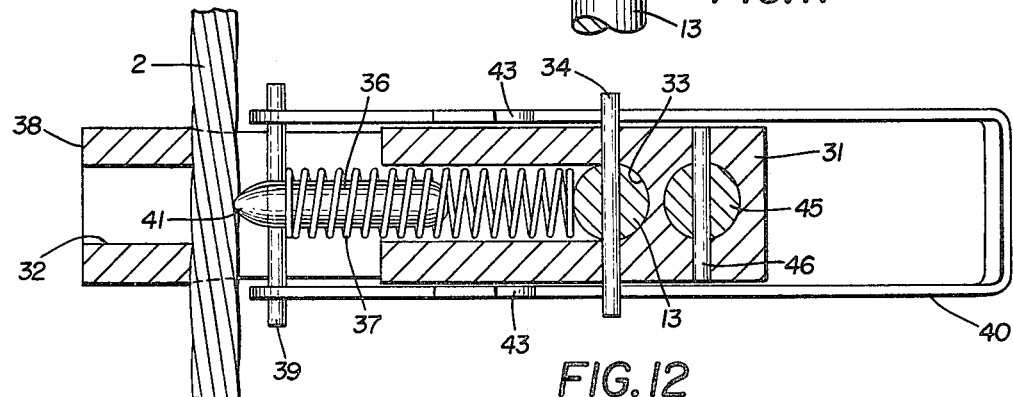
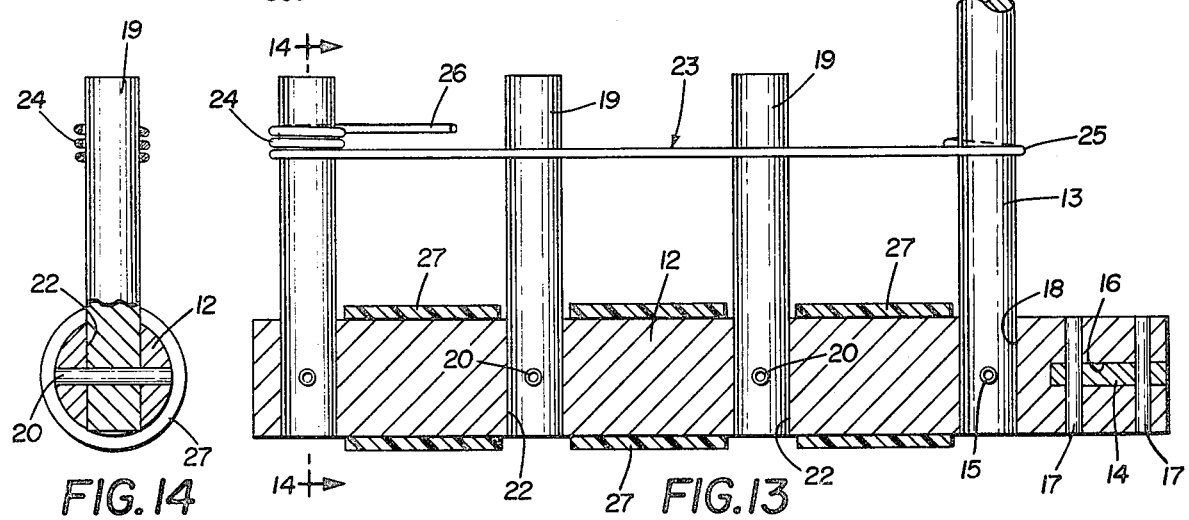

4,475,715

AERIAL CABLE INSTALLATION BLOCK

BACKGROUND OF THE INVENTION

1. Field of the Invention

The invention relates to blocks for installing aerial cable on a support cable which is attached to and extends between a plurality of poles. More particularly, the invention relates to an aerial cable installation block for installing aluminum coaxial cable for TV transmission which prevents kinking or bending of the cable during installation by providing spaced points of support for the cable.

2. Description of the Prior Art

In recent years cable television has become increasingly popular wherein TV signals are gathered by a single main antenna and distributed throughout an area by cables which are mounted on telephone and electric company poles. Individual cable drops then extend from the main supply cables to individual houses to provide a greater variety of programming and better television reception.

A usual television signal cable is a coaxial cable consisting of a thin, outer aluminum sheath with a central signal carrying conductor also formed of aluminum preferably with a copper coating. These inner and outer cables which extend coaxially are separated by a dielectric material such as extruded polyethylene or other plastic material. The spacing of the signal-carrying central conductor with respect to the outer aluminum sheath is critical since any variation in separation will affect the signal attenuation and the characteristic impedance of the cable.

Heretofore, this coaxial cable was installed by a plurality of aerial blocks, each block usually consisting of a single pulley rotatably mounted on a bracket which is supported on a support cable or messenger strand which extends between the poles. The cable is payed out from a large reel containing the cable in lengths ranging from 1,000 to 3,000 feet. Unless extreme care is taken during the installation of the cable, a small bend or kink will develop in the cable as it is being pulled through the pulleys due to the aluminum outer sheath not being strong enough to support the cable weight between the blocks. This introduces small bends referred to in the industry as "wee-wa" which when the cable is ultimately lashed to the support cable, the cable will not lie tightly against the supporting cable throughout its entire length. This results in a rough installation which increases the cost of the job since the contractor must go completely along the line and straighten the coaxial cable to get a satisfactory installation. In the event that the bends or wee-was are not removed, they will shorten the cable life approximately one third since the wind and weather conditions will loosen the lashing wires and allow rubbing between the aluminum outer sheath and support cable wearing through the sheath resulting in bad signal transmission and ultimately requiring replacement of the cable. One of the ways which reduces such unwanted bending is to place the support blocks at extremely close spacing. However, this increases the installation cost of the cable.

Various types of cable blocks have been devised with various attachments for rigidly or releasably mounting the block to the supporting cable. However, all of these known blocks use only a single point of cable support usually a rotatable pulley for the cable supporting means. Some examples of these prior art aerial blocks are shown in U.S. Pat. Nos. 856,335, 2,980,401, Re. 25,549, 3,134,575, 3,853,304, and 4,160,540.

Therefore, the need has existed for an aerial cable installation block which provides adequate support for the coaxial cable during installation to prevent bending or kinking in the cable thereby considerably reducing additional installation expense and maintenance after the cable has been lashed to the supporting strand. There is no known installation block which achieves this advantage by providing a pair of spaced supports on a relatively simple, lightweight frame member.

SUMMARY OF THE INVENTION

Objectives of the invention include providing an improved block construction for installing aerial cable which supports the cable at spaced positions to reduce the formation of bends in the cable thereby enabling the cable to lie tightly against the supporting cable throughout its length when lashed thereto, and in which the spaced supports cannot be obtained by a single block or supporting pulley unless the pulley is extremely large in diameter. Another objective is to provide such an improved aerial block in which the spaced support arrangement reduces the number of blocks that are required between poles for adequately supporting the coaxial cable thereby saving considerable labor during installation by reducing the number of blocks that must be installed and removed, and more importantly reduces the necessity of straightening the cable throughout its length after being lashed to the supporting cable to eliminate unwanted bends that heretofore occurred during installation.

Another objective is to provide such an improved aerial block consisting primarily of a lightweight aluminum frame formed of two generally L-shaped members connected by a stabilizing bar, in which the vertical leg members of the L-shaped frames have hooked ends for suspending the frame from the cable when located at a pole, in which a spring-biased plunger mechanism is mounted on each of the vertical leg members for releasably securing the improved aerial block on the supporting strand at between pole locations, in which the plunger mechanism suspends the frame on the supporting cable whereby the spaced cable support members extend horizontally outwardly from the vertical leg members, and in which the plunger mechanism permits sliding movement of the frame along the supporting cable during a lashing operation. Still another objective of the invention is to provide such an aerial block in which a plurality of cables may be simultaneously supported on the frame and retained in place by a plurality of dividers and a releasable retaining member, and in which the cables are supported on rotatably mounted plastic sleeves or wheels which facilitate movement of the cable along the frame.

A still further objective of the invention is to provide such an improved aerial cable installation block which is extremely simple in operation, lightweight, rugged, relatively inexpensive and which reduces cable installation costs; and which provides for a more satisfactory cable installation by eliminating difficulties existing in the art, by satisfying existing needs and by obtaining new results in the art.

These objectives and advantages are obtained by the improved aerial cable installation block, the general nature of which may be stated as including a frame having a pair of spaced upstanding vertical members and a pair of spaced outwardly extending members; means mounted on each upstanding vertical member for releasably mounting the frame on a supporting cable; and means mounted on each of the outwardly extending members for receiving and supporting one or more aerial cables to provide a pair of horizontally spaced cable supports for the aerial cable to reduce bending of the cable during installation.

BRIEF DESCRIPTION OF THE DRAWINGS

A preferred embodiment of the invention, illustrative of the best mode in which applicant has contemplated applying the principles, is set forth in the following description and shown in the drawings and is particularly and distinctly pointed out and set forth in the appended claims.

FIG. 3 is an enlarged fragmentary plan view looking in the direction of arrows 3—3, FIG. 1;

FIG. 4 is an enlarged sectional view taken on line 4—4, FIG. 1;

FIG. 5 is an enlarged fragmentary sectional view taken on line 5—5, FIG. 1;

FIG. 6 is an enlarged fragmentary sectional view taken on line 6—6, FIG. 1;

FIG. 9 is an enlarged fragmentary elevational view of one of the cable clamping assemblies of the cable installation block of FIG. 2 shown in unlatched position;

FIG. 10 is a fragmentary sectional view taken on line 10—10, FIG. 9;

FIG. 11 is an enlarged view similar to FIG. 9, portions of which are in section, showing one of the cable clamping assemblies in a larched, cable clamping position;

FIG. 12 is a sectional view taken on line 12—12, FIG. 11;

FIG. 13 is an enlarged fragmentary sectional view taken on line 13—13, FIG. 2; and FIG. 14 is a partial sectional view taken on line 14—14, FIG. 13.

Similar numerals refer to similar parts throughout the drawings.

DESCRIPTION OF THE PREFERRED EMBODIMENT

Figure 1:
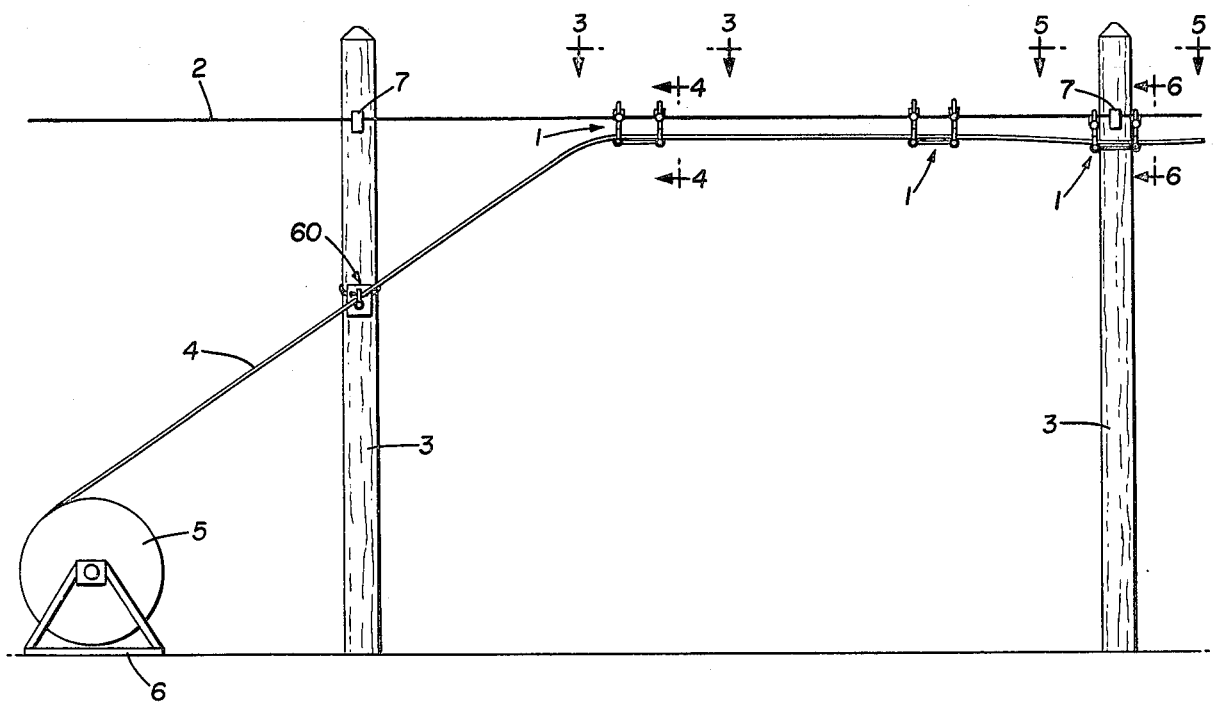
FIG. 1 is a diagrammatic perspective view of the improved cable installation block and pole bracket being shown during a pullout procedure of aluminum tube coaxial cable.
Figure 2:
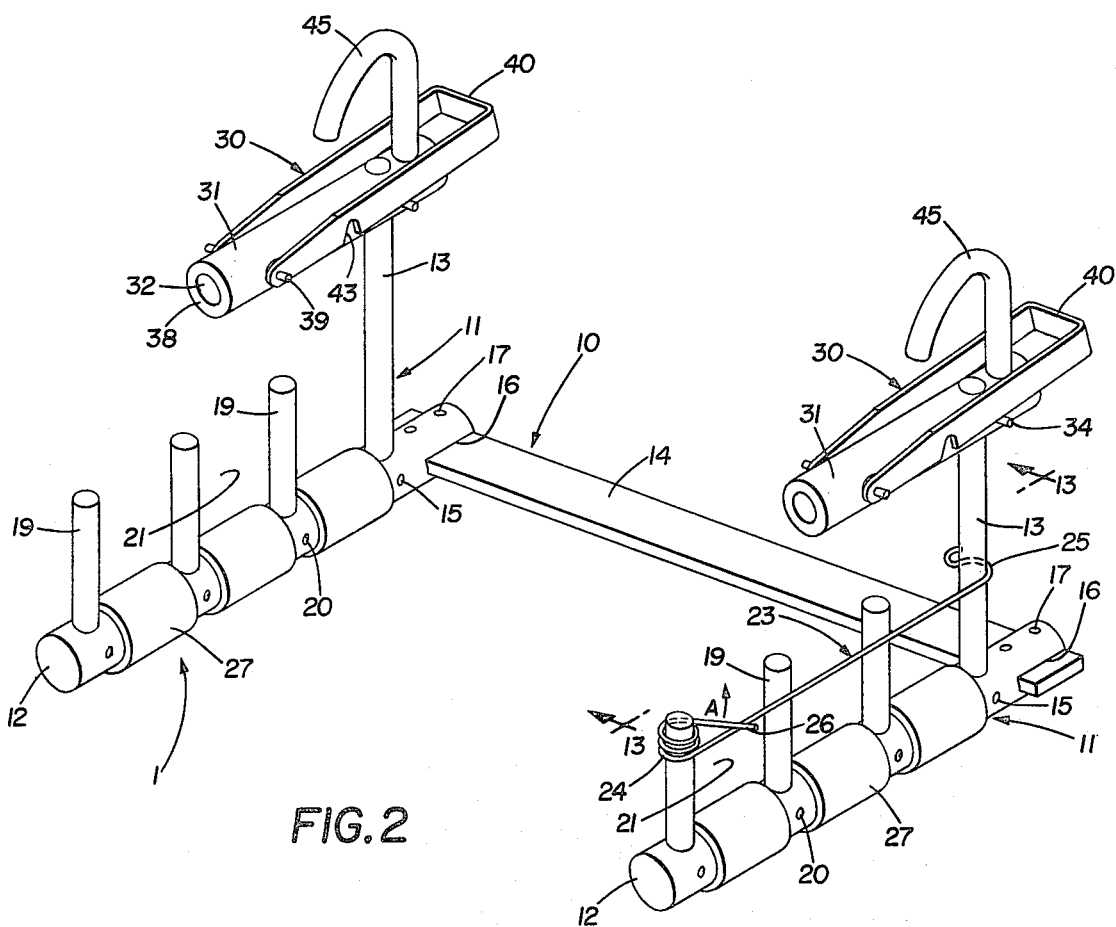
FIG. 2 is an enlarged perspective view of the improved cable installation block.

The improved cable installation block is indicated generally at 1, and is shown particularly in FIG. 2. A plurality of cable blocks 1 are shown in FIG. 1 mounted on a support cable or messenger wire 2 which extends between a pair of power poles 3 with a coaxial television transmission cable 4 being shown installed thereon. Coaxial cable 4 is payed out from a reel 5 that is rotatably mounted on a stand 6. Supporting cable 2 is attached to each pole 3 by a mounting bracket 7. Cable 2 is strung at a high tension and is adapted to support the entire weight of the coaxial cables 4.

In accordance with one of the features of the invention, improved cable block 1 is easily adaptable for installation both in a span between two poles or at a pole location without modification. In FIG. 1, two of the improved cable blocks 1 are shown releasably supported on cable 2 in a span between poles 3 with a single cable block 1 being releasably mounted on cable 2 at a pole location.

Improved cable block 1 is shown in FIG. 2 and includes a frame indicated generally at 10, which is formed by a pair of L-shaped members 11, each consisting of an outwardly extending member 12 and an upwardly extending member 13. Members 12 and 13 are referred to throughout the following discussion as horizontal and vertical members respectively, due to the position that these members will assume when cable block 1 is mounted in position on a supporting cable 2 when installing coaxial cable 4. L-shaped members 11 are connected by a stabilizing bar 14 which extends horizontally between and is connected to spaced horizontal members 12 adjacent vertical members 13. Members 12 and 13 preferably are lightweight aluminum tubular-shaped rods. Members 13 are mounted in openings 18 formed in rods 12 and secured therein by a roll pin 15 (FIGS. 2 and 13). Preferably bar 14 is a flat member also formed of lightweight aluminum and is seated within slots 16 formed in the ends of horizontal members 12 and secured therein by roll pins 17.

A plurality of divider posts 19 are mounted in holes 22 formed in horizontal members 12 and spaced along the length thereof and are secured therein by roll pins 20 (FIG. 13). Divider posts 19 provide a plurality of spaced zones 21 with each zone being adapted to slidably receive a coaxial cable 4. A keeper indicated generally at 23, is mounted on the frontmost divider post 19 and extends across spaced zones 21 and is releasably engageable with vertical member 13 to maintain the cables within their respective zone during installation. Keeper 23 preferably is formed of spring steel and includes a coiled end 24 which pivotally mounts the keeper on post 19, and a latched end 25 for releasably engaging keeper 23 with vertical member 13 to retain keeper 23 in the cable retaining position as shown in FIG. 2. Movement of a keeper tab 26 in the direction of arrow A (FIG. 2) will release the clamping pressure exerted by coiled end 24 on post 19 enabling keeper 23 to be swung easily between the latched position of FIG. 2 and an unlatched position (not shown).

A plastic sleeve 27 is rotatably mounted on horizontal member 12 between each pair of divider posts 19 and between the innermost post 19 and vertical member 13 to facilitate the sliding movement of coaxial cable 4 over spaced support members 12.

In accordance with another of the main features of the invention, a mechanism indicated generally at 30 is mounted on the upper end of each vertical member 13 for releasably mounting frame 10 on supporting cable 2. Each mechanism 30 is identical, therefore, only one is described in detail and shown in the drawings, particularly in FIGS. 9-12. Mechanism 30 includes a tubular-shaped member 31 formed with a hollow bore 32 which extends generally throughout the length of tube 31. Tube 31 is formed with hole 33 (FIG. 11) in which the upper end of vertical member 13 is inserted and secured by a roll pin 34 for mounting tubular member 31 on vertical members 13.

A notch 35 is formed in the bottom of tube 31 and communicates with bore 32 for receiving a supporting cable 2 therein. A plunger 36 is slidably located within tube bore 32 and is biased by a coil compression spring 37 toward the open front end 38 of tube 31 toward clamping engagement with a supporting cable 2 when cable 2 is located therein as shown in FIGS. 11 and 12.

One end of spring 37 abuts against vertical member 13 and the other end abuts against a pivot pin 39 on which a latch 40 is pivotally mounted. The nose of plunger 36 preferably is rounded at 41 so as not to damage or cut into supporting cable 2. Latch 40 is a U-shaped member having a pair of aligned notches 43 formed in the legs thereof. The extended ends of roll pin 34 are engageable in latch notches 43 to maintain plunger 36 in a non-clamping, cocked position as shown in FIG. 9.

In further accordance with the invention, an inverted U-shaped hook indicated generally at 45, is mounted on each tubular member 31 by a roll pin 46 and extends upwardly therefrom. Hooks 45 provide openings 47 for suspending frame 10 on a supporting cable 2 when improved cable block 1 is mounted at a pole location as shown in FIGS. 5 and 6. When block 1 is mounted at a pole location, spring-biased plungers 36 do not engage cable 2. Frame 10 is suspended from cable 2 by U-shaped hooks 45 with cable 2 extending in through openings 47 formed thereby as shown in FIG. 6. In this position stabilizer bar 14 abuts pole 3 which maintains cable block 1 in its proper position for installing coaxial cable 4, wherein members 12 extend in an outwardly extending horizontal direction.

Figure 7:
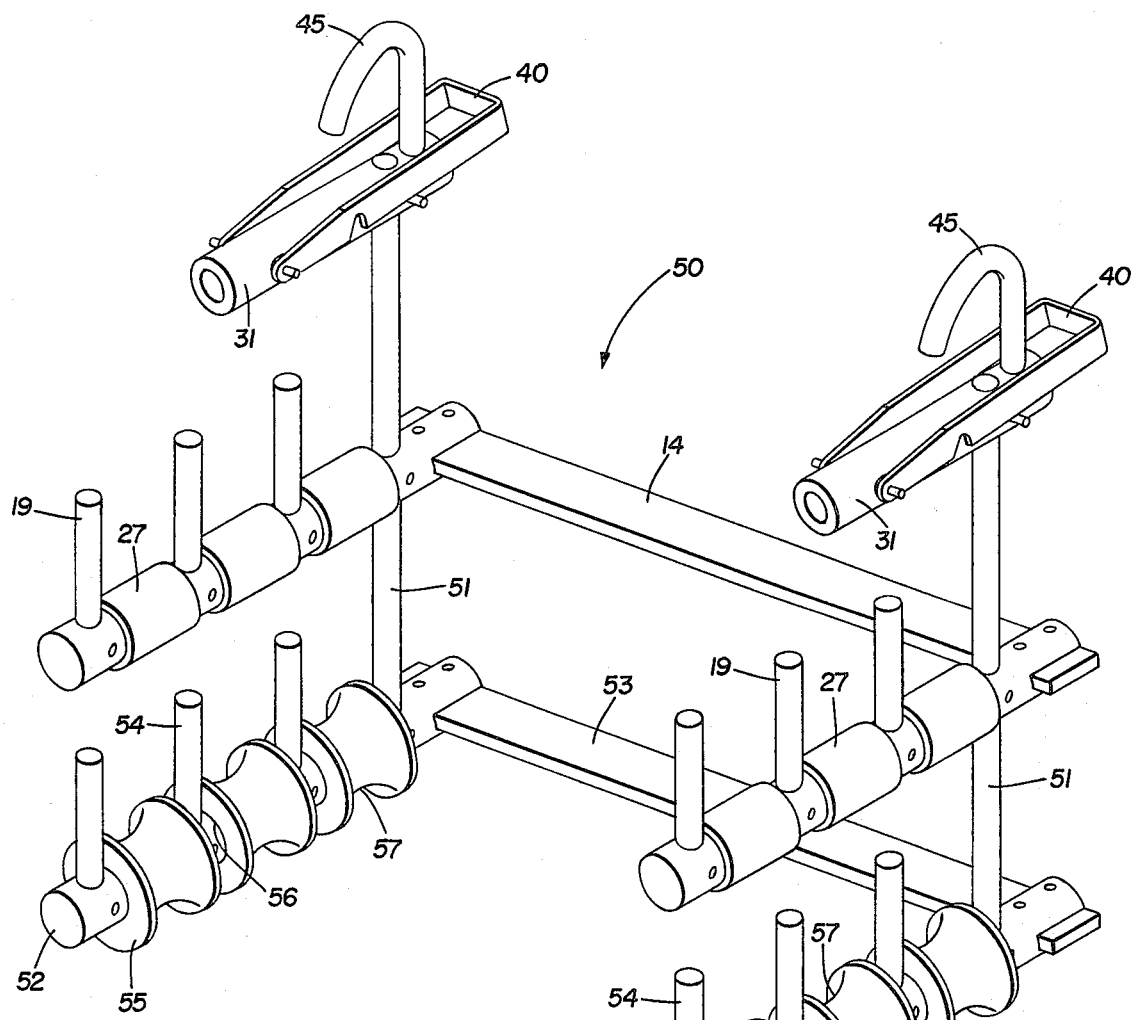
FIG. 7 is an enlarged perspective view of a modified form of the improved cable installation block.

FIG. 7 shows a modified cable block indicated generally at 50. The upper portion of modified block 50 is identical to block 1. The modification includes a second layer or tier of spaced cable guide supports. This additional support is achieved by providing longer vertical members 51 and a second pair of horizontally extending spaced members 52. A stabilizing bar 53 extends between the ends of horizontal members 52 in a similar manner as upper stabilizer bar 14.

A plurality of divider posts 54 are spaced along horizontal members 52 similar to divider posts 19. If desired, plastic sleeves may be mounted between divider post 54 similar to plastic sleeves 27. However, another modification is shown in block 50 of FIG. 7 in that plastic sleeves 27 are replaced on lower horizontal members 52 by grooved wheels 55. Wheels 55 preferably are molded of plastic and have a central opening 56 which rotatably mounts the wheels on horizontal members 52. The grooved periphery 57 of wheels 55 receives coaxial cable 4 therein and assists in slidably moving the cable during installation. Wheels 55 have the advantage of preventing cable 4 from rubbing against divider posts 54 when the cable traverses an angle. The operation and manner of use of modified block 50 is the same as block 1 which is described in detail below.

Figure 8:
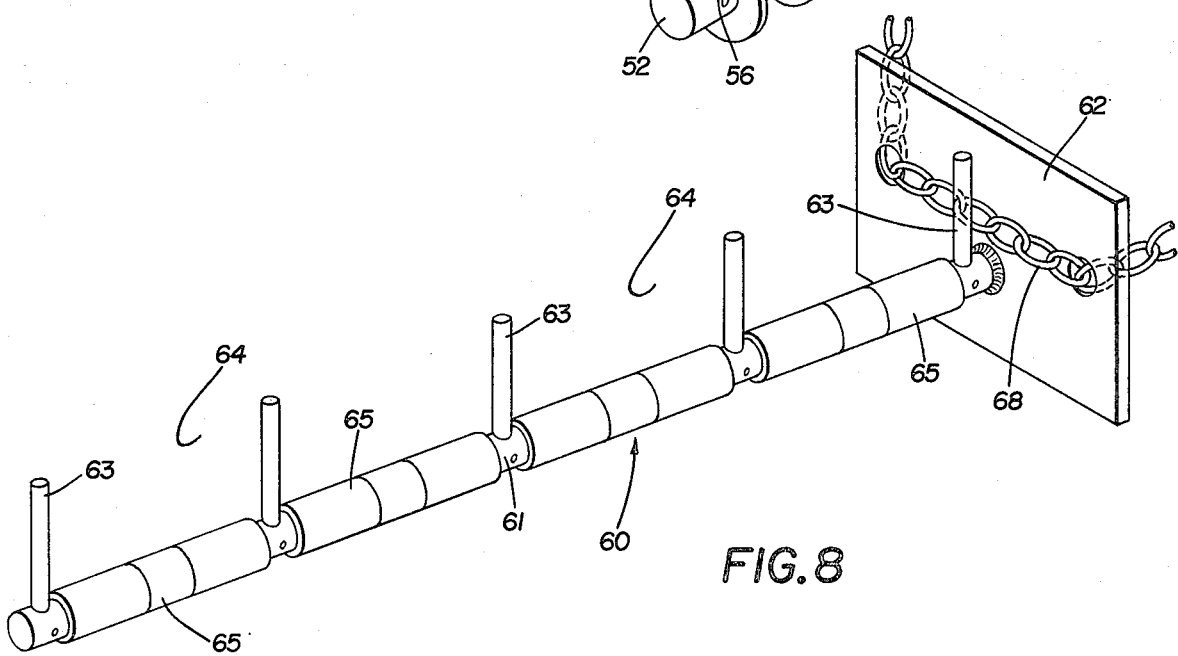
FIG. 8 is an enlarged perspective view of the cable pole support bracket shown in FIG. 1.

FIG. 8 shows another piece of equipment which may be used with cable blocks 1 and 50, and is referred to as a pole bracket and is indicated generally at 60. Pole bracket 60 includes a horizontal member 61 formed of an aluminum rod which is welded to a flat plate 62. Plate 62 is adapted to be attached to pole 3 by a chain 68 at a location which is in line with the path that cable 4 takes in moving from reel 5 to the first cable block 1 as shown in FIG. 1. Bracket 60 prevents excessive weight from being placed on cable 4 in extending between reel 5 and block 1. A plurality of divider posts 63 are mounted on horizontal members 61 and extend upwardly therefrom forming a plurality of coaxial cable receiving zones 64. A plurality of plastic sleeves 65 similar to sleeves 27 are rotatably mounted on member 61 between posts 63 to facilitate the sliding movement of cables 4 through zones 64.

The manner of use of improved cable blocks 1 and 50 is shown particularly in FIG. 1. The midspan blocks are releasably secured to supporting cable 2 by spring-biased plungers 36 as shown in FIGS. 3, 4, 11 and 12. The clamping engagement of plungers 36 against supporting cable 2 will maintain blocks 1 in the vertical position as shown in FIG. 4 wherein members 13 extend vertically and members 12 extend horizontally. One or more coaxial cables 4 are slidably received within spaced zones 21.

The cable block 1 that is located at a pole location is releasably mounted or hung on supporting cable 2 by U-shaped hooks 45 as shown in FIGS. 5 and 6. The abutment of stabilizing bar 14 against the pole maintains blocks 1 in the correct vertical position. Thus, an axial cable 4 is drawn over spaced horizontal members 12 which provide spaced points of support for each block reducing the possibility of bends being formed therein as occurs with the usual single pulley or roller type block. It is calculated that a spacing of eleven inches between the center lines of horizontal members 12 is the equivalent of having a single roller with a fifteen foot diameter in order to achieve the same non-bending characteristics as that achieved by block 1. The two-tiered configuration of modified block 50 enables a larger number of coaxial cables 4 to be installed simultaneously for certain installations than with the single tier arrangement of block 1.

Another feature of the improved cable block is that a particular compression spring 37 is selected whereby the biasing force which is exerted by the spring, is sufficient to maintain frame 10 in its vertical position without restricting sliding movement of frame 10 along supporting cable 2 when moved by a lashing machine (not shown). The lashing machine applies a lashing wrap around the coaxial cables 4 and supporting cable 2 in a usual manner after the cables have been suspended beneath cable 2 on blocks 1.

Thus, blocks 1 and 50 provide an extremely lightweight, rugged, inexpensive device for installing coaxial cables which eliminates or appreciably reduces the possibility of bends being formed in the cable during installation, and which requires a smaller number of blocks to be used between poles than with the single supporting roller or pulley type cable blocks.

Accordingly, the construction is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved aerial cable installation block is constructed and used, the characteristics of the construction, and the advantageous, new and useful results obtained; the new and useful structures, devices, elements, arrangements, parts, and combinations, are set forth in the appended claims.

I claim:

1. An improved block construction for installing aerial cable on a supporting cable, said construction including:
   (a) a frame having a pair of spaced upstanding vertical members and a pair of spaced outwardly extending members;
   (b) spring biased plunger means mounted on each upstanding vertical member, said plunger means being biased toward a clamping position against the supporting cable for releasably mounting the frame on a supporting cable; and
   (c) means mounted on each of the outwardly extending members for receiving and supporting one or more aerial cables to provide a pair of horizontally spaced cable supports for the aerial cable to reduce bending of the cable during installation.

2. The block construction defined in claim 1 in which the outwardly extending members are perpendicular with respect to the vertical members and lie in a generally horizontal plain.

3. The block construction defined in claim 2 in which the vertical and horizontal members are cylindrical bars formed of aluminum.

4. The block construction defined in claim 2 in which a plurality of dividers are mounted on the outwardly extending members and extend upwardly therefrom to form a plurality of individual, spaced, cable supporting areas.

5. The block construction defined in claim 4 in which a sleeve is rotatably mounted on each of the cable supporting areas of the pair of outwardly extending members to facilitate the movement of cable on said members during the installation of an aerial cable.

6. The block construction defined in claim 4 in which cable keeper means is removably mounted on at least one of the dividers and engageable with the adjacent vertical member for retaining the cable on the outwardly extending cable supporting member during installation of a cable.

7. The block construction defined in claim 6 in which the keeper means is an elongated piece of wire having a coiled end and a hooked end; and in which the coiled end is pivotally mounted on one of the dividers and the hooked end is releasably engaged with said one vertical member.

8. The block construction defined in claim 1 in which each of the vertical members is mounted on a respective one of the outwardly projecting members to form a pair of generally L-shaped members; and in which a stabilizer bar extends between and is connected to the L-shaped members adjacent the junction of the vertical and outwardly projecting members.

9. The block construction defined in claim 1 in which the releasable supporting cable mounting means includes an inverted U-shaped hook formation on the upper end of each upstanding vertical member.

10. The block construction defined in claim 1 in which a latch is engageable with each of the spring-biased plungers to latch said plungers in cocked, nonclamping positions.

11. The block construction defined in claim 1 in which there are two pairs of horizontally spaced cable support means; and in which one pair of said horizontally spaced cable support means is spaced vertically from the other pair.

12. The block construction defined in claim 1 in which each of the spring-biased plunger means includes a spring-biased plunger mounted within a tubular-shaped body; in which a notch is formed in each of the tubular-shaped bodies for receiving the support cable therein, wherein the cable can be clampingly engaged by the plunger; and in which a latch operatively engages each of the plungers to selectively retain said plungers out of clamping engagement with the support cables.

13. An improved block construction for installing aerial cable on a supporting cable, said construction including:
   (a) a frame having a pair of spaced upstanding vertical members and a pair of spaced outwardly extending members;
   (b) means mounted on each upstanding vertical member for releasably mounting the frame on a supporting cable;
   (c) means mounted on each of the outwardly extending members for receiving and supporting one or more aerial cables to provide a pair of horizontally spaced cable supports for the aerial cable to reduce bending of the cable during installation;
   (d) a plurality of dividers mounted on the outwardly extending members and extending upwardly therefrom to form a plurality of individual, spaced, cable supporting areas; and
   (e) an elongated piece of wire having a coiled end and a hooked end for retaining the cable on the outwardly extending cable supporting members during installation of a cable, said coiled end being pivotally mounted on one of the dividers and the hooked end being releasably engaged with one of the vertical members.

14. The block construction defined in claim 12 in which an inverted U-shaped hooked formation is mounted on each of the tubular-shaped bodies and extends upwardly therefrom for releasably mounting the frame on the supporting cable when used at a pole location; and in which the frame includes a stabilizing bar extending between the outwardly extending members, said bar being engageable with a pole when the frame is mounted on the supporting cable by the hooked formation to maintain the vertical members in a vertical position.

* * * * *